Figure 1:
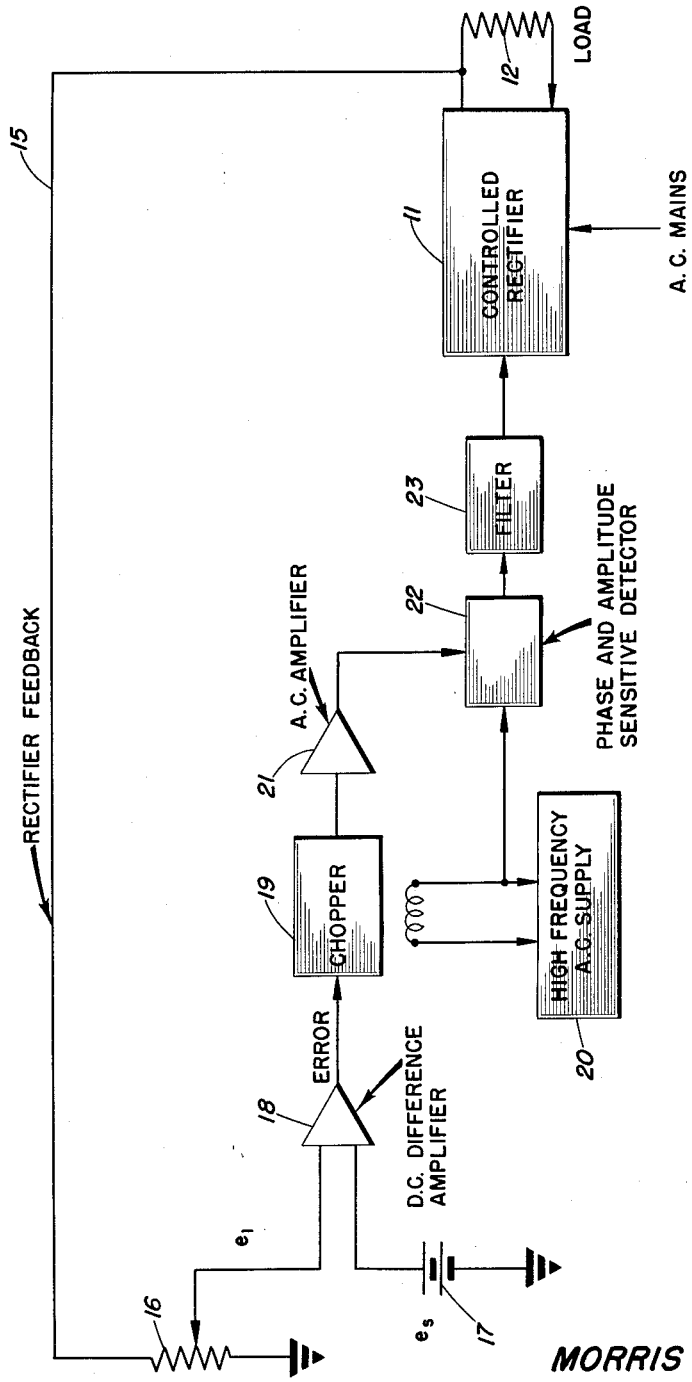

Sept. 6, 1955 M. RIBNER 2,717,352

REGULATOR FOR D.C. GENERATOR

Filed Nov. 19, 1954 2 Sheets-Sheet 2

INVENTOR

MORRIS RIBNER

ATTORNEYS

United States Patent Office 2,717,352
Patented Sept. 6, 1955

2,717,352

REGULATOR FOR D. C. GENERATOR

Morris Ribner, Silver Spring, Md., assignor to the United States of America as represented by the Secretary of the Navy Application November 19, 1954, Serial No. 470,145

7 Claims. (Cl. 322—36)

The present invention relates to a regulated rectifier. In greater detail, the present invention relates to a sensitive means for controlling the current or voltage output of A. C. to D. C. converters comprising either rectifiers of the igniter or control grid class or direct current generators.

In the application of various types of electronic equipment a source of direct current is required. Frequently, the successful operation of a particularly sensitive electronic circuit depends upon the provision of a source of direct current which can be relied upon to maintain a constant voltage. Conventionally, direct current for the operation of electronic equipment is supplied by rectifiers which serve to convert widely available alternating current to direct current. A simple rectifier having no regulating means inherently possesses the disadvantage of transmitting to the load, in the form of variations in output voltage, fluctuations in the alternating voltage input or variations induced by load conditions.

Hitherto, rectifiers have been regulated to eliminate output voltage variations by the use of either regulating tubes inserted in series with the load or variable impedances which are inserted in series with the alternating current supply.

The prior methods of regulation are disadvantaegous in certain applications for the reason that the power absorbed by the regulating tubes may be excessive where high current outputs are desired. Other types of control are generally not sufficiently responsive to maintain constant outputs under fast transient load conditions. Moreover, prior regulators often drifted from the desired output voltage level thereby necessitating frequent readjustments.

It is well known that the major source of drift in prior regulated rectifiers is brought about by the utilization of direct coupled amplifiers which successively amplify any shift in the quiescent voltage of the preceding stage. Amplification by means of resistance-capacity or transformer-coupled amplifiers eliminates the drift in the quiescent voltage of a tube from its output, thereby preventing a cascading process of drift amplification such as occurs in direct coupled amplifiers.

It is therefore an object of the present invention to provide a regulated rectifier utilizing amplifiers which are substantially free from drift, thereby eliminating the necessity for frequent readjustments of said rectifier.

It is another object of the present invention to provide a regulated rectifier which possesses increased efficiency over prior rectifiers.

It is a further object of the present invention to provide a regulated rectifier which will compensate for transient line and load conditions.

It is still another object of the present invention to provide a regulated rectifier readily adapted to supply either constant direct current or constant direct voltage to a load, as desired.

Figure 2:
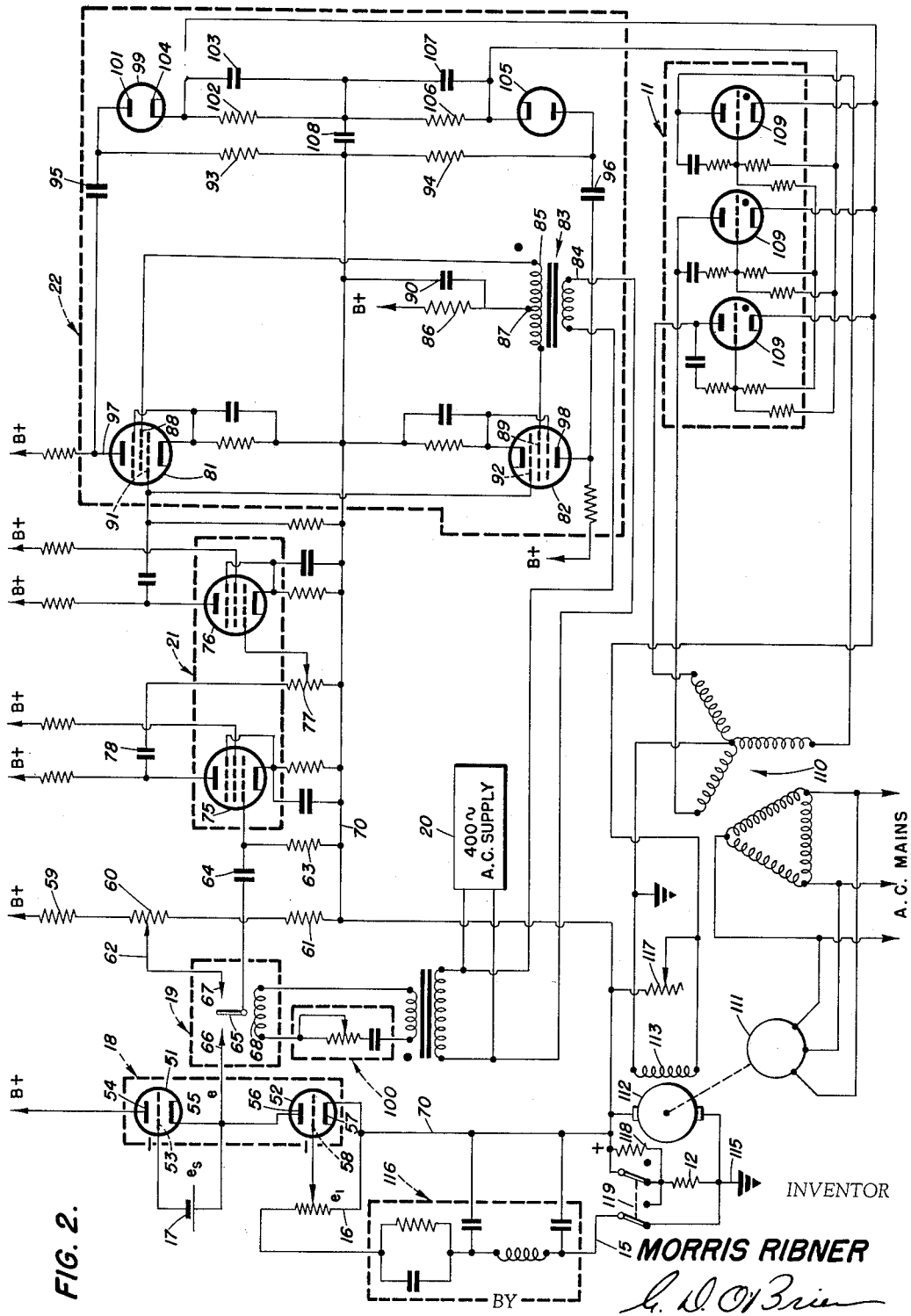

Other objects and many of the attendant advantages of this invention will be readily appreciated as the same becomes better understood by reference to the following detailed description when considered in connection with the accompanying drawings, wherein:

Fig. 1 is a functional block diagram of the regulated rectifier which is the subject of the present invention; and Fig. 2 is a circuit diagram of the present invention showing a preferred embodiment as a voltage regulator for a direct current generator.

The present invention is represented in block form in Fig. 1. A controlled rectifier 11, of the thyratron or ignitron type, receives energy in the form of alternating current and delivers direct current to the load 12, which may comprise a generator field winding, in an amount which depends upon the voltage applied to the control grids or igniters of said rectifier. The rectifier output voltage is impressed across a potentiometer 16 by a feedback conductor 15. A voltage $e_1$, which is proportional to the rectified output, and which may be adjusted as desired, appears at the output of potentiometer 16. The voltage $e_1$ is compared to a reference voltage $e_s$, derived from battery 17, in a direct coupled difference amplifier 18 to produce an error signal proportional to the difference between the voltage $e_1$ and the voltages $e_s$. The error signal is converted by a chopper modulator 19 from a direct to an alternating voltage. The chopper 19 is preferably excited by means of a high frequency alternating current supplied from a source, 20, separate from the A. C. power mains. The provision of a separate high frequency source, as at 20, has the advantage of generating high frequency harmonics which can be more effectively filtered with short time-constant filters than would be possible utilizing power line frequencies. The time required for the device to respond is thereby reduced.

The alternating output of the chopper is highly amplified by an alternating current amplifier 21 of either the resistance-capacity or transformer-coupled type. The output of amplifier 21 is then reconverted into a direct voltage by a detector 22 which also receives a phase reference voltage from the chopper source 20 and which is capable of altering the polarity of its output according to the phase of the output of amplifier 21 with respect to the phase reference voltage. In addition, the magnitude of the output of the detector 22 is proportional to the amplitude of the output of amplifier 21. The output of the detector 22 therefore contains all the information possessed by the original error signal and thus enables the achievement of a sensitive regulator as is explained with particularity hereinafter.

The ripple present in the output of detector 22 is smoothed by a filter 23 for application as a control voltage to the rectifier 11. The rectifier 11 may be of any conventional controlled type, such as thyratrons or ignitrons which receive power from either single or polyphase A. C. mains. Preferably, a polyphase circuit is employed to reduce filtering requirements and thereby reduce the time required for the rectifier to respond to changes in its control voltage.

In Fig. 2, the present invention is shown in a preferred embodiment as a voltage regulator for a direct current generator. The difference amplifier, shown generally at 18, includes two series connected triodes 51 and 52. The cathode 55 of triode 51 and the plate 56 of triode 52 are connected directly together. The plate 54 of triode 51 is attached to the positive terminal B+ of an auxiliary power supply (not shown), while the cathode 57 of triode 52 is connected to a signal ground 70. The auxiliary power supply may be of any conventional design, preferably of the regulated type.

The grids 53 and 58 of triodes 51 and 52 receive as their respective voltages the output $e_s$ from the standard reference voltage source, which comprises a battery 17, and a voltage $e_1$, which is proportional to the voltage impressed across the load 12, said voltage $e_1$ being adjustable by means of a potentiometer 16. The signal ground 70 is a point of common potential separated from earth ground to permit earthing the negative terminal of the generator, and at the same time the utilization of the negative load voltage as an input to the difference amplifier. Thus, a negative voltage output of the battery 17 can be applied to the triode grid 53, prolonging the life of said battery since no current is drawn therefrom. An analysis of the operation of a difference amplifier similar to amplifier 18 is given at page 147 in the book Electron Tube Circuits by Seely, published by McGraw-Hill, 1950.

A difference amplifier arranged as shown provides an output voltage, $e$, which varies in proportion to the difference between the input voltages $e_s$ and $c_i$. However, unless the amplifier is arranged for balanced operation by returning the cathode 57 to a negative voltage source rather than to signal ground, a quiescent voltage will appear at the output of the amplifier even when the input voltages are equal or zero. A biasing arrangement for the purpose of eliminating the effects of the quiescent voltage is shown as including a chain of resistors 59, 60, and 61, connected in series from B+ to signal ground 70. The central resistor 60 is provided with an adjustable output tap 62 to permit adjustment of the bias voltage.

The output of the difference amplifier, which includes the error signal, $e$, plus a quiescent bias, is converted from a direct to an alternating voltage by a chopper, shown generally at 19, and a resistor 63-capacitor 64 network. The chopper 19 comprises a vibrating switch arm 65 driven between the chopper contact 66, which is connected to the output of amplifier 18, and contact 67, which is connected to tap 62 of the bias chain, in synchronism with the frequency of the voltage derived from the source 20 and applied to the chopper coil 68. The condenser 64, connected directly to the arm 65 and grounded through resistor 63, thereby alternately acquires a voltage equal to the output voltage of amplifier 18 and a voltage equal to the bias voltage present at tap 62. By means of the alternately applied voltages, current is caused to flow into and away from condenser 64 and thus a voltage is developed across resistor 63 which alternates in synchronism with the switch arm 65 and which has an amplitude proportional to the error signal $e$.

An alternating current amplifier 21, comprising two cascaded pentode voltage amplifier stages of conventional design, receives the converted error voltage. The voltage developed across resistor 63 is amplified in the first pentode 75 to produce a magnified output voltage which is coupled to the second pentode 76 by means of a resistor 77-capacitor 78 network. The resistor 77 may conveniently comprise a potentiometer to allow for adjusting the amplitude of the output of pentode 76.

The alternating output of amplifier 21 is suppplied to the control grids 91 and 92 of pentodes 81 and 82, presenting a control voltage identical in amplitude and phase to each of the pentodes 81 and 82. A transformer 83 having its primary winding 84 connected to the high frequency alternating current source 20 supplies alternating screen electrode voltage through its center tapped secondary winding 85. Screen voltage is obtained by the connection of a dropping resistor 86 and decoupling capacitor 90 from B+ to the center tap 87 of transformer 83.

The alternating component of the screen voltage applied to screen electrode 88 differs in phase by 180° to that applied to screen electrode 89. A definite phase relationship exists between the output of amplifier 21 and the screen voltage. Therefore, it will occur that one of the pentodes 81 or 82 will conduct more heavily than the other of the pentodes depending on whether or not the voltages applied to their respective screen and control electrodes are in phase. Inasmuch as an appreciable phase shift may occur in amplifier 21, a phase compensating network, as shown at 100, may be required to advance or retard the phase of the chopper excitation voltage and thereby optimize the performance of the detector 22.

The output of the pentode detectors is pulsating direct current which could be filtered and used directly for controlling the rectifier 11. Direct application however requires that a bucking voltage be applied to the rectifier 11 to overcome the quiescent voltage of the pentodes 81 and 82. The voltage of the source from which the rectifier 11 draws power can be reduced by providing resistor-capacitor differentiating networks to remove the quiescent voltage of the pentodes 81 and 82 from their outputs. A capacitor 95 is connected to the plate 97 of pentode 81 and returned to signal ground through a resistor 93 to block the undesired quiescent voltage from the output of pentode 81. Similarly, a capacitor 96 is connected to the plate 98 of pentode 82 and returned to signal ground through a resistor 94. A diode 99 having its plate 101 connected at the junction of capacitor 95 and resistor 93 rectifies the alternating output of the resistor 93-capacitor 95 network. A filter, comprising a resistor 102 and a capacitor 103 connected in parallel from the cathode 104 of diode 99 to signal ground through an isolating capacitor 108 smoothes the output of diode 99 for application as a control voltage to the rectifier 11. An identical arrangement including a diode 105, a resistor 106 and a capacitor 107 rectifies and filters the alternating output of the resistor 94-capacitor 96 network attached to the plate 98 of pentode 82.

The diodes 99 and 105 are each arranged to produce a rectified voltage of positive polarity. Since no signal ground connections are established in the rectifier 11 the rectifier control voltage is effectively the difference between the diode output voltages. Therefore, the rectifier control voltage is apparently positive or negative according to whether the output of diode 99 is greater or less than the output of diode 105.

The rectifier 11 comprises a conventional half wave, three phase circuit utilizing bias phase controlled thyratron tubes 109. The operation of a bias phase controlled rectifier is described at page 287 in the book Electron Tube Circuits to which reference has hereinabove been made. A suitable delta-wye connected transformer 110 is provided for the purpose of supplying power to the rectifier 11 from the A. C. mains. An A. C. motor 111 having its rotor mechanically coupled to the armature of a D. C. generator 112 furnishes mechanical power for the operation of generator 112. The output of generator 112 is supplied directly to the load 12 with the feedback conductor 15 attached at the earth ground 115 to measure the total load voltage. A filter 116 may be inserted in series with the feedback conductor 15 to smooth commutator hash and to stabilize operation of the system. Excitation for the field 113 of generator 112 is supplied by the controlled rectifier 11, which varies the field current in accordance with the generator output. A portion of the generator excitation may be obtained by the shunt connection of a rheostat 117 from the positive generator output terminal to the field 113. It will be understood however that it is desirable to obtain only partial excitation in this manner.

The provision of a field controlled D. C. generator for the conversion of alternating current to direct current in accordance with the present invention is particularly advantageous for the generation of low voltages, since the D. C. generator field can be constructed to have a relatively high resistance as compared with the load. The use of a higher rectifier output voltage than that demanded by the load is thereby made possible. In addition, the field excitation current is not great, hence a low capacity rectifier can be used thereby reducing the cost of said rectifier.

A simple modification of the present invention permits its application to the control of load current rather than load voltage. The modification simply involves the insertion of a suitably low valued resistor 118 in series with the load 12 and the transfer of lead 15 from earth ground 115 to the junction of the load 12 and resistor 118. The resistor 118 may suitably comprise an ammeter shunt resistor. If desired, when converting from constant voltage to constant current regulation, a double pole, double throw switch 119 may be employed to effect the required circuit alterations.

In the operation of the present invention, the voltage supplied to the load 12 by the generator 112 is applied to the potentiometer 16. The potentiometer 16 is adjusted to balance the voltage of the reference source 17 at the desired generator output voltage and the adjustable tap 62 of resistor 60 is positioned to balance the quiescent voltage output of amplifier 18. Thereafter, any departure of the load voltage from the desired value will produce an error signal output by amplifier 18. The error signal output is converted into an alternating voltage by means of the chopper 19 and highly amplified by the A. C. amplifier 21 for application to the phase and amplitude sensitive detector 22 wherein a control voltage having a magnitude and direction dependent upon the original error signal is recovered.

The desirability of providing a phase sensitive detector is that the polarity of an error in the voltage output of the rectifier is conveyed in the output of amplifier 21 solely in terms of the phase of the output with respect to the chopper excitation voltage. It is an obvious requisite that the means controlling the rectifier output have the vectorial characteristics of magnitude and direction. The control means must be sensitive not only to a difference between the rectifier output and the reference voltage, but it must also be known whether the rectifier voltage is above or below the desired value to respond appropriately.

The conveyance of information indicating the polarity of the error signal in the form of phase variations in the output of amplifier 21 can best be explained by consideration of an example.

Let it be assumed that the output voltage of amplifier 18 is greater than its quiescent value, indicating that the generator voltage is higher than the desired value. The positive half cycle of the chopper excitation voltage drives the chopper arm 65 into engagement with contact 66, causing capacitor 64 to charge to the output voltage of amplifier 18 and thereby to produce a positive surge of voltage input to amplifier 21. On the negative half cycle of the chopper excitation voltage, arm 65 engages contact 67. During that time, capacitor 64 discharges to a voltage equal to that at tap 62 of bias resistor 60. A negative surge of voltage input to amplifier 21 thereby results. The voltage input to amplifier 21 is thus an alternating voltage in phase with the chopper excitation voltage. Alternatively, if the output of amplifier 18 is less than the quiescent voltage of amplifier 18, as would occur if the generator voltage were lower than the desired value, an alternating voltage output 180° out of phase with the chopper excitation voltage would result.

The detector 22 serves to restore the amplified alternating error voltage output of amplifier 21 to a direct voltage for controlling the rectifier 11. The detected voltage possesses a polarity indicating whether the generator output is above or below the desired value and has a magnitude which is proportional to, although many times greater than, the difference between the generator output voltage and the desired output voltage. Pentodes 81 and 82 comprise the principal part of the amplitude and phase sensitive detector. As hereinabove noted, the impedance of the pentodes 81 and 82 depends in part upon whether the voltages applied to the screen and control electrodes of one of the pentodes are in phase or out of phase with each other. The magnitude of the output voltage of either pentode depends upon its change of impedance. Moreover, it can easily be shown that either of the pentodes exhibits greater changes of impedance when the control grid voltage is in phase with the alternating component of screen grid voltage. For present purposes a satisfactory explanation of the operation of the detector can be made upon consideration of conditions within both pentodes at any given time.

Assuming that an error signal in phase with the chopper excitation voltage is applied to control grids 91 and 92 and the transformer 83 is connected so that the alternating component of the voltage applied to screen electrode 88 is in phase with the chopper excitation voltage, then the voltage output of pentode 81 will exceed the output of pentode 82. In the event that the voltage applied to control grids 91 and 92 is not in phase with the chopper excitation voltage, pentode 82, having an alternating component of screen voltage out of phase with the chopper excitation voltage by 180°, will produce an output voltage exceeding that of pentode 82. Therefore, one of the pentodes, 81 or 82, will have an output greater than the other of the pentodes depending upon the phase of the voltage applied to the control grid. The amount by which the output of one of the pentodes exceeds the output of the other depends upon the amplitude of the control voltage.

The phase detector output, after rectification in the diodes 99 and 105, operates to either advance or delay the ignition time of the thyratrons 109 thereby raising or lowering the excitation current of generator 112 to maintain a constant voltage output by said generator.

Obviously many modifications and variations of the present invention are possible in the light of the above teachings. It is therefore to be understood that within the scope of the appended claims the invention may be practiced otherwise than as specifically described.

What is claimed is:

1. A regulated rectifier for converting alternating current to direct current, comprising, a source of alternating current for supplying power to said rectifier, controllable means receiving alternating current from said source and rectifying said received alternating current to provide a direct current, a load absorbing said direct current and developing a voltage thereacross, a source of constant unidirectional potential, means for comparing said constant unidirectional potential with said load developed voltage to produce an error signal, said error signal representing a departure of said load developed voltage from a desired value, means for modulating said error signal to produce an alternating signal voltage related to said error signal, drift-free means for amplifying said alternating signal, and means for converting the amplified alternating signal to a control voltage for altering the output of said controllable rectifier, so constructed and arranged that the departure of said load developed voltage from a preselected desired value will produce a control voltage for altering the output of said rectifier to restore said load voltage to the preselected desired value.

2. Apparatus as claimed in claim 1, wherein said means for comparing said constant unidirectional potential with said load developed voltage comprises a direct coupled difference amplifier.

3. Apparatus as claimed in claim 1, wherein said means for converting the amplified alternating signal to a control voltage comprises a phase selective detector.

4. A voltage regulated direct current generator comprising, a direct current generator having a field winding and providing a direct voltage output, means for supplying mechanical power to said generator, means for supplying a unidirectional reference voltage, means for comparing said generator output with said reference voltage to provide a direct current error, means for converting said error from a direct to an alternating signal voltage, drift-free means for amplifying said alternating signal voltage, a detector to receive said amplified signal voltage and reconvert said amplified signal voltage to a unidirectional control voltage, and means controllable by said control voltage for supplying exciting current to said generator field, so constructed and arranged that the departure of said generator output voltage from a preselected value causes changes in said generator field current tending to restore said generator output voltage to said preselected value.

5. A voltage regulated direct current generator comprising, a direct current generator having a field winding and providing a direct current voltage output, means for supplying mechanical power to said generator, means for supplying a unidirectional reference voltage, means for comparing said generator output with said reference voltage to provide a direct current error, means for converting said error from a direct current to an alternating curent signal, drift-free means for amylifying said alternating current signal, a detector to receive said amplified signal and reconvert said amplified signal to a unidirectional control voltage, and means controllable by said control voltage for supplying exciting current to said generator field, said last-named means including a rectifier for converting alternating current into direct current in controlled amounts, so constructed and arranged that departure of said generator output voltage from a preselected value causes changes in said generator field current tending to restore said generator output voltage to said preselected value.

6. A voltage regulated direct current generator comprising, a direct current generator having a field winding, and providing a direct current output, means for supplying mechanical power to said generator, means for supplying a unidirectional reference voltage, means for comparing said generator output with said reference voltage to provide a direct current error, a chopper for converting said error from a direct current to an alternating current signal, a source of alternating current for driving said chopper, drift-free means for amplifying said alternating current signal, a phase selective detector to receive said amplified signal and reconvert said amplified signal to a unidirectional control voltage in accordance with the phase of said amplified signal with respect to the phase of current supplied by said alternating current source, and means controllable by said control voltage for supplying exciting current to said generator field, said last-named means including a rectifier for converting alternating current into direct current in controlled amounts, so constructed and arranged that departure of said generator output voltage from a preselected value causes changes in said generator field current tending to restore said generator output voltage to said preselected value.

7. A regulated direct current generator comprising, a direct current generator having a field winding and providing a direct current output, means for supplying a reference voltage, a first source of alternating current, means for comparing said generator output with said reference voltage to provide a direct current error, means for converting said error from a direct to an alternating current in synchronism with current supplied by said first alternating current source, said converting means providing a phase shift with respect to said current from said alternating current source whenever said error signal indicates a change in said generator output from above a desired value to below said desired value, drift-free means for amplifying said converted error, a detector including means responsive to the amplitude and phase of said amplified converted error for reconverting said amplified converted error to a unidirectional control voltage, said control voltage having a magnitude proportional to said amplified converted error and a direction dependent upon the phase of said amplified converted error relative to the current from said first alternating current source, a second source of alternating current, and means controllable by said control voltage for converting current from said second source of alternating current into a direct current for exciting said generator field, so constructed and arranged that departure of said generator output voltage from a desired value causes changes in said generator field exciting current tending to restore said genertaor output voltage to said desired value.

No references cited.